US011354607B2

(12) United States Patent
Byron et al.

(10) Patent No.: US 11,354,607 B2
(45) Date of Patent: Jun. 7, 2022

(54) ITERATIVE COGNITIVE ASSESSMENT OF GENERATED WORK PRODUCTS

(71) Applicant: International Business Machines Corporation, Armonk, NY (US)

(72) Inventors: Donna K. Byron, Petersham, PA (US); Carmine DiMascio, West Roxbury, MA (US); Christian Ewen, New York, NY (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 16/044,116

(22) Filed: Jul. 24, 2018

(65) Prior Publication Data

US 2020/0034758 A1    Jan. 30, 2020

(51) Int. Cl.
*G06Q 10/06* (2012.01)
*G06Q 30/00* (2012.01)
(Continued)

(52) U.S. Cl.
CPC ....... *G06Q 10/063* (2013.01); *G06F 16/9038* (2019.01); *G06N 20/00* (2019.01); *G06Q 30/0601* (2013.01)

(58) Field of Classification Search
CPC ............. G06Q 10/063; G06Q 30/0601; G06Q 30/0207–0277; G06F 16/9038; G06N 20/00
See application file for complete search history.

(56) References Cited

U.S. PATENT DOCUMENTS 5,496,962 A    3/1996 Meier et al.
5,991,734 A    11/1999 Moulson
(Continued)

FOREIGN PATENT DOCUMENTS

JP    2005321668    11/2005

OTHER PUBLICATIONS

C. M. Mihăescu, O. M. Teodorescu, P. Ș. Popescu and M. L. Mocanu, "Learning analytics solution for building personalized quiz sessions," 2017 18th International Carpathian Control Conference (ICCC), 2017, pp. 140-145, doi: 10.1109/CarpathianCC.2017.7970386. (Year: 2017).*

(Continued)

*Primary Examiner* — Sun M Li
(74) *Attorney, Agent, or Firm* — David K. Mattheis; Maeve M. Carpenter (57) ABSTRACT

An iterative process for cognitive assessment of generated work products relies on a variety of assessors providing different granularities such as coarse, medium and fine, in combination with user guidance. A cognitive system generates candidates based on soft constraints such as user preferences. The candidates are analyzed using first assessors to compute preliminary scores which are ranked and presented to a user. Based on user selection/adjustment, the system generates a final work product which is analyzed using second assessors, and presents the final work product and final scores to the user. There may be multiple iterations of the user adjustment and refined presentation of final work products. The invention may be consummated by receiving confirmation of the final work product from the user, and taking some action such as electronically completing a purchase of a product or electronically reserving a third-party service.

15 Claims, 5 Drawing Sheets

(51) Int. Cl.
*G06Q 30/06* (2012.01)
*G06N 20/00* (2019.01)
*G06F 16/9038* (2019.01)

(56) References Cited

U.S. PATENT DOCUMENTS

| | | |
|---|---|---|
| 6,299,920 B1 | 10/2001 | Saksena |
| 8,086,484 B1 | 12/2011 | Gibson |
| 8,219,607 B2 | 7/2012 | Srinivasa |
| 8,370,176 B2 | 2/2013 | Vespasiani |
| 9,009,082 B1 | 4/2015 | Marshall et al. |
| 9,572,361 B2 | 2/2017 | Bordin |
| 9,870,550 B2 | 1/2018 | Byron et al. |
| 2005/0289582 A1 | 12/2005 | Tavares et al. |
| 2006/0247943 A1 | 11/2006 | Kapoor |
| 2013/0149678 A1* | 6/2013 | Tokuda ............ A47J 36/321 434/127 |
| 2014/0188566 A1 | 7/2014 | Pinel et al. |
| 2015/0112843 A1 | 4/2015 | Pinel et al. |
| 2015/0161912 A1 | 6/2015 | Bhattacharjya et al. |
| 2015/0332313 A1 | 11/2015 | Slotwiner et al. |
| 2016/0048853 A1 | 2/2016 | Bhattacharjya et al. |
| 2016/0103839 A1 | 4/2016 | Altaf et al. |
| 2016/0225284 A1* | 8/2016 | Schoen ............ G09B 19/0092 |
| 2016/0274076 A1 | 9/2016 | Hofleitner et al. |
| 2017/0128007 A1 | 5/2017 | Hayter et al. |
| 2017/0177826 A1 | 6/2017 | Alexander et al. |
| 2017/0337838 A1* | 11/2017 | Elkon .................... G06F 3/048 |
| 2018/0349795 A1* | 12/2018 | Boyle .................... G06N 20/00 |

OTHER PUBLICATIONS

M. Gusev, S. Ristov and G. Armenski, "Interactive adaptivity in Assessment as a Service," 2013 International Conference on Interactive Collaborative Learning (ICL), 2013, pp. 588-595, doi: 10.1109/ICL.2013.6644660. (Year: 2013).*

Arnold, Scott, et al., "A Quantitative Screening-Level Approach to Incorporate Chemical Exposure and Risk Into Alternative Assessment Evaluations", Integrated Environmental Assessment and Management, v. 13, n. 6, pp. 1007-1022 (2017).

Kim, Yoon Jeon, et al., "Applying Evidence-Centered Design for the Development of Game-Based Assessments in Physics Playground", Int'l. J. of Testing, v. 16, n. 2, pp. 142-163 (2016).

Parker, Peter, et al., "Differentiating Assessment from Evaluation as Continuous Improvement Tools", 31st ASEE/IEEE Frontiers in Education Conf., v. 1, pp. 1-6 (2001).

Varshney, Lav, et al., "Cognition as a Part of Computational Creativity", Proc. IEEE Int'l. Conf. on Cognitive Informatics & Cognitive Computing, pp. 36-43 (2013).

* cited by examiner

ITERATIVE COGNITIVE ASSESSMENT OF GENERATED WORK PRODUCTS

BACKGROUND OF THE INVENTION

Field of the Invention

The present invention generally relates to computational techniques for generation of work products, and more particularly to a method of assessing generated work products.

Description of the Related Art

As computational technology advances, an increasing number of work products are generated automatically or semi-automatically with the assistance of computing devices, particularly those possessing artificial intelligence. A cognitive system (sometimes referred to as deep learning, deep thought, or deep question answering) is a form of artificial intelligence that uses machine learning and problem solving. Cognitive systems often employ neural networks although alternative designs exist. A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

One example of automated generation of new work products and work plans can be found in U.S. Patent Application Publication no. 2014/0188566 which describes an approach that is useful for various purposes, among them, meal planning. According to that approach constituents for a new work product are selected and existing work products are analyzed to identify constituents frequently combined with the selected constituents and constituents frequently used to create work products in that class of work product. One or more new work products are then generated using constraints pertaining to the work product.

This approach can include an evaluation of a generated work product. Work product evaluation is a fundamental component of computational creativity. While it is fairly easy to write algorithms that create large numbers of instantiations of work product candidates (recipes, paintings, music play lists, meal plans, etc.), these products must be evaluated to determine whether they have any value to a user. Possible evaluation approaches include using human assessment, automated scoring, or automatic formulation of an optimization problem.

SUMMARY OF THE INVENTION

The present invention in at least one embodiment is generally directed to a method of assessing generated work products by receiving a plurality of soft constraints relating to the work products wherein the soft constraints are considered desirable but not required by a cognitive system adapted to generate the work products, generating a plurality of candidate work products based on the soft constraints using the cognitive system, analyzing the candidate work products using a first set of multiple assessors to compute multiple preliminary scores for each candidate work product, presenting at least a portion of the candidate work products to a user ranked according to their preliminary scores, receiving a user selection for at least one selected candidate work product from the user, generating at least one (tentative) final work product based on the selected candidate work product using the cognitive system wherein the final work product includes additional features not present in the selected candidate work product, analyzing the final work product using a second set of multiple assessors which is different from the first set of multiple assessors to compute multiple final scores for the final work product, and presenting the final work product to the user with the final scores. The soft constraints can include preferences previously associated with the user. In one implementation the soft constraints constitute a coarse-grained assessment, the multiple preliminary scores constitute a medium-grained assessment concerning additional details not found in the coarse-grained assessment, and the multiple final scores constitute a fine-grained assessment concerning additional details not found in the medium-grained assessment. The assessments may iterate by receiving a user adjustment to any final work product, and iteratively repeating the generating of additional final work products, the analyzing of the final work products, and the presenting of the final work products to the user. In an exemplary embodiment the first and second assessor sets have at least one assessor in common, and that common assessor can compute a first type of score for the preliminary scores while computing a second type of score for the final scores wherein the first and second score types are based on different factors. The invention may be consummated by receiving confirmation of the final work product from the user, and taking some action such as electronically completing the purchase of a product or electronically reserving a third-party service.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

While automated work product generation has greatly improved, there are still problems relating to inadequate assessment of candidate work products making it difficult to provide a superior solution that is customized to an end user. Human assessment introduces myriad opportunities for mistakes. These may arise from simple errors, bias, insufficient training, poor protocols, or unsatisfactory understanding of an end user's needs or desires. In many cases human assessment is also infeasible, as a single task (e.g., the creation of a recipe, itinerary, or music composition) can result in the creation of billions of candidate work products to evaluate. Calculating a score (or several scores) for each generated work product is more useful in evaluating work products which are generated in large numbers. Only the products with the highest scores for suitability and quality are retained. This approach may be more difficult with composite creations, such as a meal plan spanning several days' worth of recipes, since independent scoring criteria fail to adequately judge emergent properties of the combinations, such as ingredient variety or reuse across several meals. Automatically formulating an optimization problem from a user-specified criterion, and finding the maximum of an objective function, is useful in theory but there are several challenges to implementation. The optimization problem formulation requires that an objective function be clearly defined. Even with the help of trade-off analytics, this is often too simplistic, and a user's preference for a creation cannot be entirely captured by a couple of scores and pre-defined weights (for example, it's not enough to balance recipe ratings and calorie counts to find what one will want to have for dinner). In other cases, the optimization problem cannot be resolved due to incomplete information. For example, nutritional details cannot be computed accurately without knowing exactly what ingredients will be used (e.g., skinless chicken breast vs. duck in a casserole, low-calorie sandwich bread vs. brioche for a sandwich). Gathering the details needed for all possible scorers for all candidate solutions in one pass may not be feasible due to time or cost constraints.

What is needed is a balanced approach that can combine partial computer optimization with human decision, where in a series of iterations, the user makes decisions about a limited number of creations, and receives guidance from the computer assessment of one or more aspects of the work product. Once human selection has taken place for some assessments, the more expensive features can be calculated and additional information gathered to refine the proposed solutions and potentially re-rank them.

Figure 1:
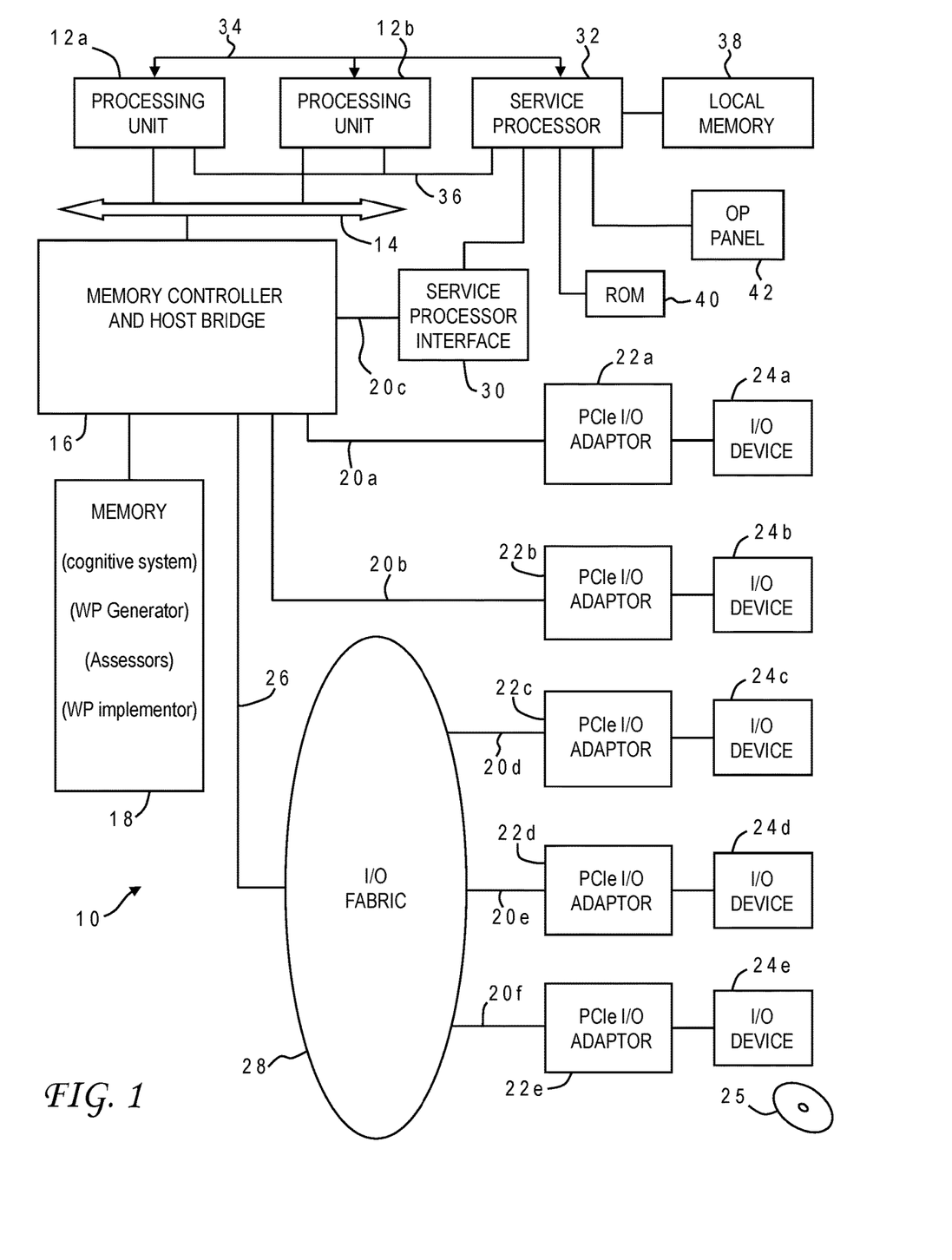
FIG. 1 is a block diagram of a computer system programmed to carry out generation of work products and assessment of those work products in accordance with one implementation of the present invention.

With reference now to the figures, and in particular with reference to FIG. 1, there is depicted one embodiment 10 of a computer system in which the present invention may be implemented to carry out the generation and evaluation of generalized work products. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, such as a cognitive system, a work product generator which may use the cognitive system, multiple assessors to provide assessments of generated work products, and appropriate software to implement a final work product based on the particular domain.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the work product generator application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a work generation and evaluation process that uses novel iterative computational techniques, but a program embodying the invention may additionally include conventional aspects of various work generation tools (such as specialized cognitive systems), and these details will become apparent to those skilled in the art upon reference to this disclosure.

Figure 2:
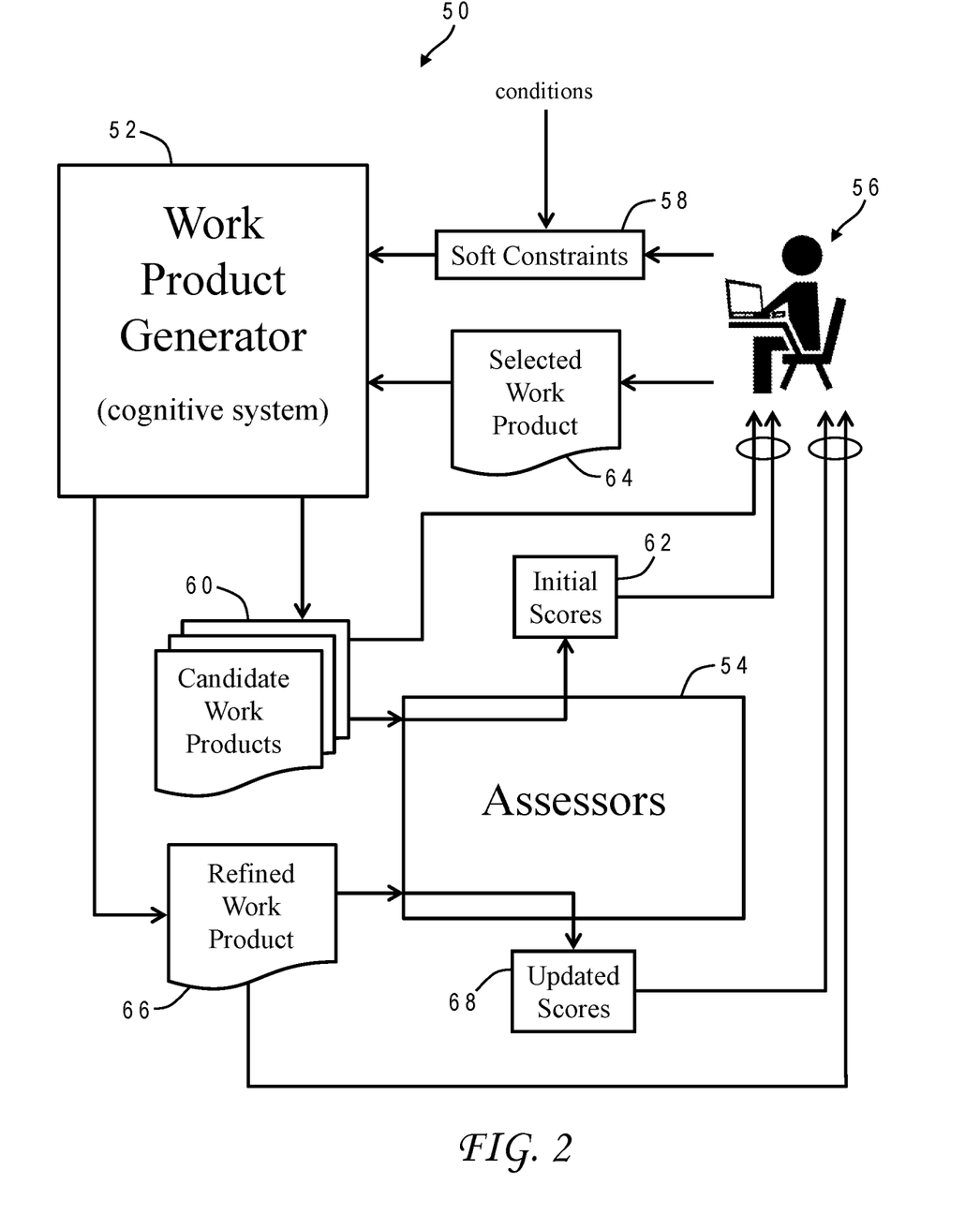
FIG. 2 is a high-level block diagram of a work product generation environment which includes a user interacting with a work product generator that includes a cognitive system and multiple assessors in accordance with one implementation of the present invention.

Referring now to FIG. 2, there is depicted a high-level block diagram of a work product generation environment 50 in accordance with one implementation of the present invention. This implementation extends the work product generator described in U.S. Patent Application Publication no. 2014/0188566, which is hereby incorporated. Work product generation environment 50 includes a work product generator 52 and a plurality of assessors 54. Work product generator 52 has an appropriate interface for receiving information from a user 56. User 56 can also use this interface to receive assessments from assessors 54. Instead of pushing a large number of generated work products to external assessors in a single step, work product generator 52 now orchestrates an iterative assessment with assessors 54, where the assessments can occur at any stage of the work product selection—even in some cases before the work products are finalized. Work products that are assessed may be singletons (e.g. recipes, songs) or composites (e.g. meal plans, play lists).

In the illustrative implementation the assessors can produce assessments with different granularity levels, such as coarse, medium and fine. A coarse assessment may comprise general directives or soft constraints based on a user's preferences (e.g. for recipe creation, "when strawberries are in season"), or based on current conditions (e.g., using a foodstuff currently in stock). A medium assessment may include a score for a given work product (e.g., food seasonality score), and possible suggestions to improve the score (e.g., "replace the blood oranges with something else"). A fine assessment may provide detailed domain-specific information, e.g., exact season of each ingredient and nearby growing regions, or suggestions for exact SKUs (stock keeping units, or other product identification codes a store uses) for a given ingredient. In addition to these levels, assessors can accept feedback from the user interactions (e.g., a recipe selected by user, and whether it contains strawberries).

Work product generator 52 can then proceed as follows. First, it obtains soft constraints 58 (coarse assessments) from user 56. While the soft constraints may come directly from the user, they may alternatively be inferred from a cognitive analysis of the user's previous selection or preference history (or from the selection of other users who have been deemed similar according to certain criteria such as demographics, e.g., "burgers are trending in New York City in July"), or a default set of constraints may be used. In this implementation the constraints are "soft" because they are deemed preferable but not absolutely required. Some of the coarse constraints may not be soft, e.g., for a user who is vegetarian and absolutely will not eat meat products. Different constraints may be provided with different levels of importance or weighting. Work product generator 52 generates a plurality of candidate work products 60 based on the soft constraints. This generation may be performed by a cognitive system trained according to the particular context of the work product, and again possibly having some previous history with the user from which it has learned (machine learning). Candidate work products 60 are fed to assessors 54 to obtain medium-grained assessments for the candidate work product. These assessments can be in the form of a set of initial scores 62 for each candidate work product, which are then ranked and presented to user 56. User 56 can select one of the work products (or some combination thereof) based on personal preference, and this selection 64 is forwarded to work product generator 52 for further refinement. The refinement is driven by the work product generator as a modified beam search. At the fine-grained level, particular specifications in the work product are proposed as concrete slot fillers (e.g., in a recipe, one of twenty different specific pasta SKUs that fills a slot for pasta).

A refined work product 66 so generated is again sent to assessors 54. For this iteration, the set of assessors used may be different than the set of assessors used for the initial candidates. These two sets may share one or more specific assessors, and that common assessor may compute different types of score in the different iterations based on different factors, as discussed further below in conjunction with FIGS. 3 and 4. The fine-grained assessment for the refined (user-selected) work product can be in the form of updated scores which are again presented to user 56. For example in the recipe generation domain, nutritional values are re-assessed once the exact product SKU is proposed, or for a meal plan, total calories for the day and ingredient variety can be re-assessed based on fine-grained revision of ingredients.

Instead of resulting in a single work product in the second iteration, work product generator 52 can suggest a plurality of new candidate work products triggering another round of changed overall scores and a re-ranked list of candidates presented to the user. The new rankings may be based on assessors whose score depends on another assessor's fine-grained assessment. In some embodiments, these dependencies are explicitly modeled to determine to re-invoke the assessors. In other embodiments, the work product generator can learn over time what assessors need to be called when (e.g., the seasonal assessor may not need to be called again once the strawberry SKU has been selected). The work product generator could also suggest work product modifications to improve scores.

User behavior feedback can be sent to each assessor to update its operation, personalizing the process. For example, the best sequence of iterations can be learned through A/B testing. If the user's choices frequently go against the coarse-grained assessments, the work product generator can add a step prompting the user to validate those assessments or bypass them altogether; if the user does not look at the fine-grained assessments, skip them; or if the user iteratively tweaks the generated work products after the medium-grained assessment, provide more substitution options.

User behavior feedback helps the work product generator decide what weight to assign to each assessor. In one implementation each assessor starts with the same weight, and the user selections will modify each weight in the long term, depending whether the selection follows or contradicts the assessor's recommendations. In the example of a meal planner, some people should see all of the selected meal templates that are scored for variety, and allow them to select the N most appealing, then gather cost data for alternate instantiations of those plans from the cost assessor (connected to grocery store APIs) to match the weekly food budget. For another user, it would be better to gather cost comparisons for the top N meals first, let them select the cheapest variants, then score the overall meal plan alternatives for other dimensions such as child-friendly. In another embodiment, users are given an opportunity to order/prioritize the assessors.

Figure 3:
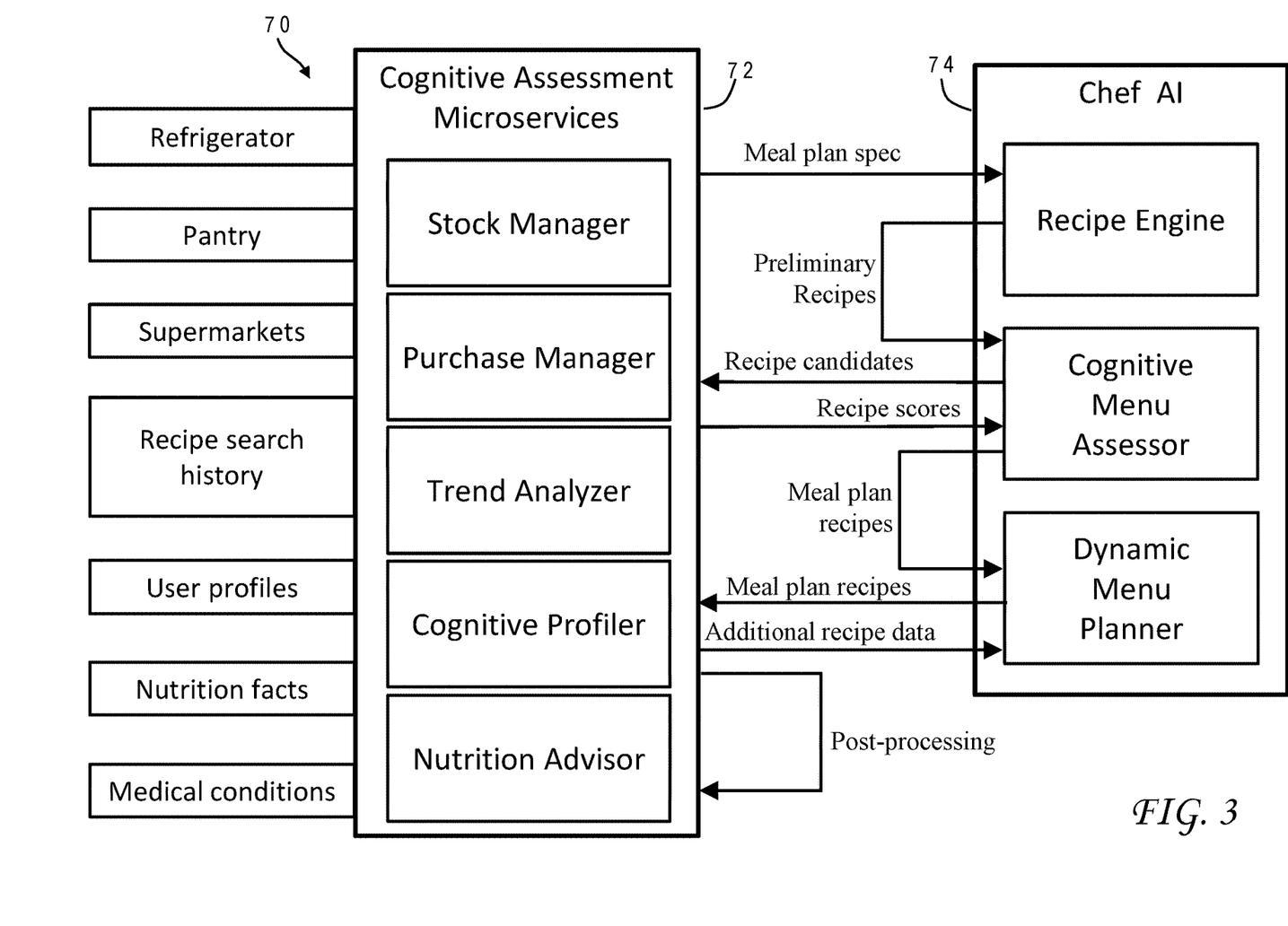
FIG. 3 is a block diagram of a first example of work product generation and evaluation using a meal planning system (chef AI) in accordance with one implementation of the present invention.

A more specific example of a meal planner is described in conjunction with FIG. 3. Meal planner system 70 includes cognitive assessment microservices 72 and an artificial intelligence chef (Chef AI) 74. Cognitive assessment microservices 72 has several modules for carrying out different functions, some of which communicate electronically with external services or objects. In this embodiment cognitive assessment microservices 72 includes a stock manager, a purchase manager, a trend analyzer, a cognitive profiler, and a nutrition advisor. The stock manager uses a digital inventory system to keep track of foodstuffs and related items such as those stored in the refrigerator or pantry of the user. The purchase manager can request purchase data from food providers such as supermarkets or corner stores. The trend analyzer uses one or more algorithms or cognitive analysis to scan electronically available information (e.g., food blogs) and detect potential trends relating to the various aspects of food consumption or availability such as the latest dessert fad. The cognitive profiler creates and updates a personalized profile for the user relating to meal plans using deep learning techniques. The nutrition advisor includes or has access to one or more databases providing nutritional information on most foods and drinks, and appropriate coding to allow computation of various values such as food quantities, calorie counts, protein requirements, vitamin and mineral recommendations, etc.

In this embodiment Chef AI 74 also has several modules including a recipe engine, a cognitive menu assessor, and a dynamic menu planner. The various arrows in the middle of the diagram represent the iterative process to produce assessments in multiple dimensions as the work product becomes more concrete. It is not necessary that every assessment microservice contributes to every iteration. Each iteration may be repeated several times, either because some microservices might change their output based on the outputs of the other services, or because the user might change her inputs.

An example workflow for system 70 begins when the user requests three main courses for this week. Coarse-grain assessors provide soft constraints: the stock manager signals to Chef AI 74 that there is chicken, milk, and onions in the refrigerator; the purchase manager signals that strawberries are on sale at the nearest supermarket; the trend analyzer signals that asparagus and strawberries are in season; other services have nothing to send to Chef AI 74 at this time. Chef AI 74 receives this information and generates preliminary recipes for the three main courses using the recipe engine. The preliminary recipes are input to the Chef AI's cognitive menu assessor which provides further analysis and balancing to generate recommended recipe candidates. Some contain strawberries, asparagus, chicken, milk and/or onions, but some do not. The recommended recipe candidates are sent back to cognitive assessment microservices 72 for further evaluation. The assessors then compute scores for each recipe candidate: the stock manager computes a food waste elimination score; the purchase manager computes a cost bracket; the nutrition advisor computes a nutrition score based on the user's goals (this might pertain to how well the proposed recipe comports with the user's desires, and not to an exact calorie count or other nutritional value); other services have nothing to send. An overall score may be further generated for each candidate based on some function of the multiple assessor scores for that candidate, such as a sum, an average, a weighted average, or any other desired function. The user reviews recipe candidates and their scores, and selects recipes for a meal plan. In another embodiment, the cognitive assessor might select the recipes itself, by choosing the recipes with top scores or choosing some at random, or choosing some that do not yet appear in the user's selection history. The cognitive assessor then passes the selections to the dynamic menu planner. Chef AI 74 scales the selected recipes and generates exact proportions and instructions using the dynamic menu planner. The dynamic planner can also suggest the best recipe sequence for variety and perishability, and provide a summarized shopping list.

The meal plan recipes are sent back to the assessors to provide more accurate recipe assessments: the purchase manager creates a shopping cart (which may be used to order missing recipe components from a local store) and computes exact cost; the nutrition advisor computes accurate nutrition facts based on menu specifics, such as calorie count, percentages of daily recommended amounts for fat, carbohydrates and protein, etc.; other services have nothing to send (note that both the medium and fine-grained assessments include assessments by the nutrition advisor but there are different types of scores from this single assessor based on different factors). The dynamic menu plan scorer recalculates overall desirability of each fine-grained plan, whereupon the user views finalized scores and can select or adjust plans to execute. Appropriate action can be taken based on the context of the work product; in this case, the purchase manager completes the purchase of additional recipe components from the store with automatic delivery to the user.

In this embodiment meal planner system 70 finishes the process by having various assessors perform post-processing tasks. These tasks may for example include the stock manager updating current inventory, the trend analyzer recording user choices for online training (machine learning), and the cognitive profiler updating the user's history. The history presents an opportunity to learn from user choices. Over time, it enables better personalized candidate recommendations (the initial presentation of recommendations to the user). The user history may also feed other machine-learning algorithms, particularly driving cohort analytics and providing the basis for recommendations that are relevant to users with similar preferences.

Figure 4:
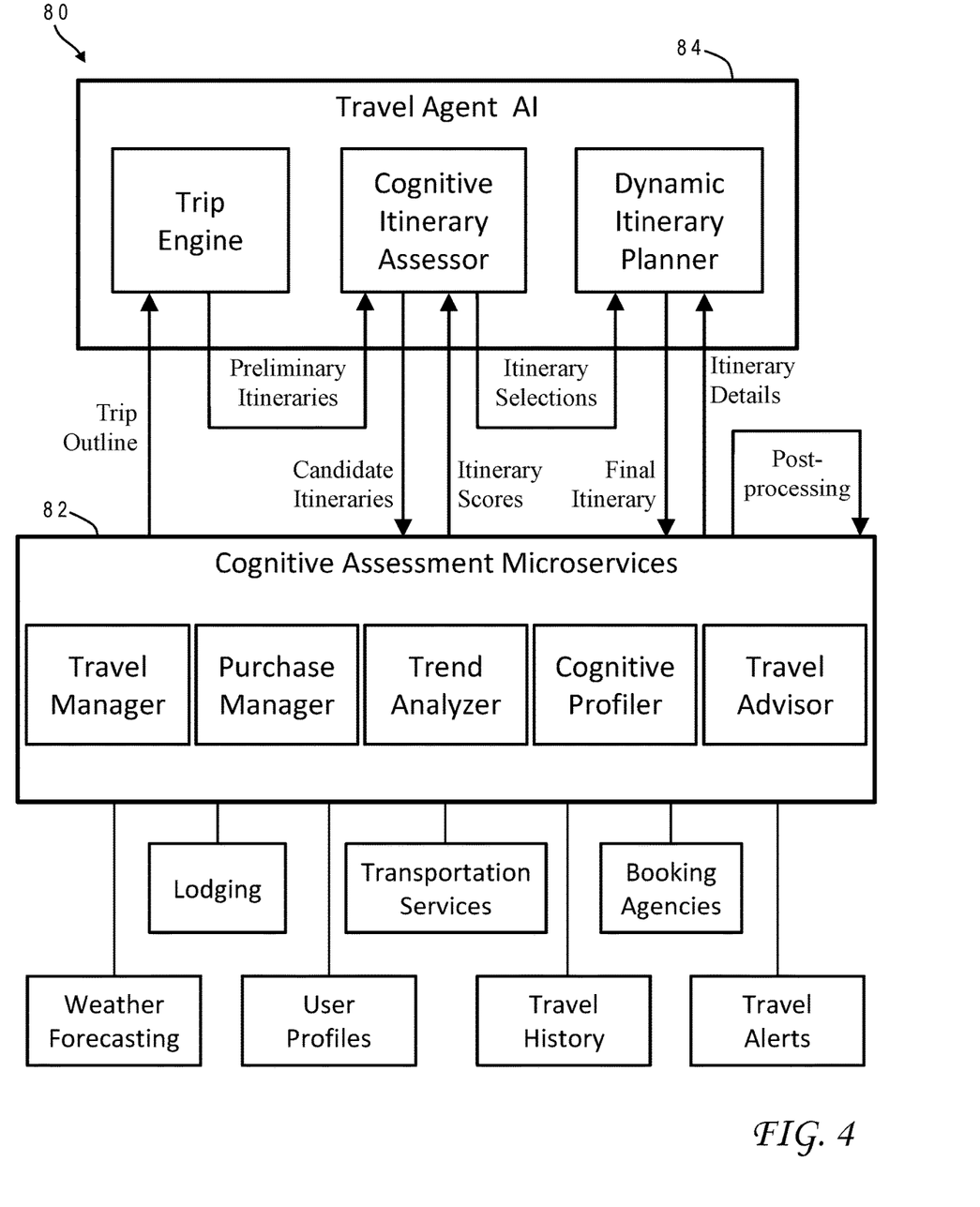
FIG. 4 is a high-level block diagram of a block diagram of a second example of work product generation and evaluation using an itinerary planning system (travel agent AI) in accordance with one implementation of the present invention.

The present invention is of course not limited to meal planning. It is applicable to virtually any work product generation which includes automation or computer guidance/assistance. As one further example, FIG. 4 shows an embodiment for an itinerary planner system 80. Itinerary planner system 80 includes another cognitive assessment microservices 82 and an artificial intelligence travel agent (Travel Agent AI) 84. Cognitive assessment microservices 82 has several modules for carrying out different functions, some of which again communicate electronically with external services or objects. In this embodiment cognitive assessment microservices 82 includes a travel manager, a purchase manager, a trend analyzer, a cognitive profiler, and a travel advisor. The travel manager communicates with various lodging facilities (hotels, motels, AirBnB, etc.), booking agencies (company-specific or aggregators), transportation providers (airplanes, buses, car rentals, trains, etc.), and other third-party services to see what destinations are available and by what means of transportation, and other relevant information such as any travel credits the user may have from credit card or airline point systems. The purchase manager can request cost data from any of these services, determine whether there are currently any specials/discounts, and execute purchase orders for travel. The trend analyzer detects potential trends relating to the various aspects of travel or destinations, like the latest "hot spots" for vacations. The cognitive profiler creates and updates a personalized profile for the user relating to travel using deep learning techniques. The travel advisor includes or has access to travel-related services such as a weather forecasting service or a travel alert service which may issue non-weather related alerts such as a security threat in a particular region as well as beneficial alerts on scheduled events in various locations. The travel advisor may use machine learning to predict unusual situations (friendly or adverse) which may be of interest to the user.

In this embodiment Travel Agent AI 84 also has several modules including a trip engine, a cognitive itinerary assessor, and a dynamic itinerary planner. An example workflow for system 80 begins when the user requests a vacation recommendation which includes at least two cities in a particular region and would last about two weeks. Coarse-grain assessors provide soft constraints: the travel manager signals to Travel Agent AI 84 that there are thirty cities in the region available in terms of transportation and lodging, and that the user has a 80,000 mile credit with a particular airline; the purchase manager signals that there are currently flight discounts applicable to four cities in the region; the trend analyzer signals that one of the cities in the region is currently considered a cultural destination for vacation travelers; other services have nothing to send to Travel Agent AI 84 at this time. Travel Agent AI 84 receives this information and generates preliminary itineraries for different cities in the region over the designated two-week time period using the trip engine. The preliminary itineraries are input to the Travel Agent's cognitive itinerary assessor which provides further analysis and balancing to generate recommended itinerary candidates. Some include a city that has been previously visited by the user, some include the city that is currently considered the cultural destination, and some include a city for primary arrival/departure which takes advantage of current flight discounts. Most recommended itinerary candidates rely on airplane travel but some suggest using trains or renting cars. The recommended itinerary candidates are sent back to cognitive assessment microservices 82 for further evaluation. The assessors then compute scores for each itinerary candidate: the travel manager computes a travel time and convenience score; the purchase manager computes a cost bracket; the travel advisor computes safety and attraction scores; other services have nothing to send. The user reviews itinerary candidates and their scores, and selects one or more itineraries for a trip plan. Travel Agent AI 84 effectuates the selected itineraries and generates an exact trip plan with specific dates, locations and services using the dynamic trip planner. The trip plan itineraries are sent back to the assessors to provide more accurate travel assessments: the purchase manager creates a shopping cart (which may be used to make travel reservations) and computes exact cost; the travel advisor computes a "go/no-go" signal based on selected destinations; other services have nothing to send. The dynamic itinerary plan scorer recalculates overall desirability of each fine-grained plan, whereupon the user views finalized scores and can select or adjust plans to execute. Appropriate actions can again be taken, e.g., the purchase manager completes the reservations, applies any travel point rewards, and schedules follow-up confirmation. Trip planner system 80 finishes the process by having various assessors perform appropriate post-processing tasks.

Just as there are other applications of the present invention besides menu generation or itinerary planning, those skilled in the art will appreciate that the cognitive assessment microservices could include additional assessors not shown. For example, one additional assessor that might be applicable to both menu generation and trip planning is a carbon footprint assessor for those individuals who are environmentally-minded. In some implementations the user is allowed to choose which assessors to deploy, optionally with different user-assigned importances (weightings).

Figure 5:
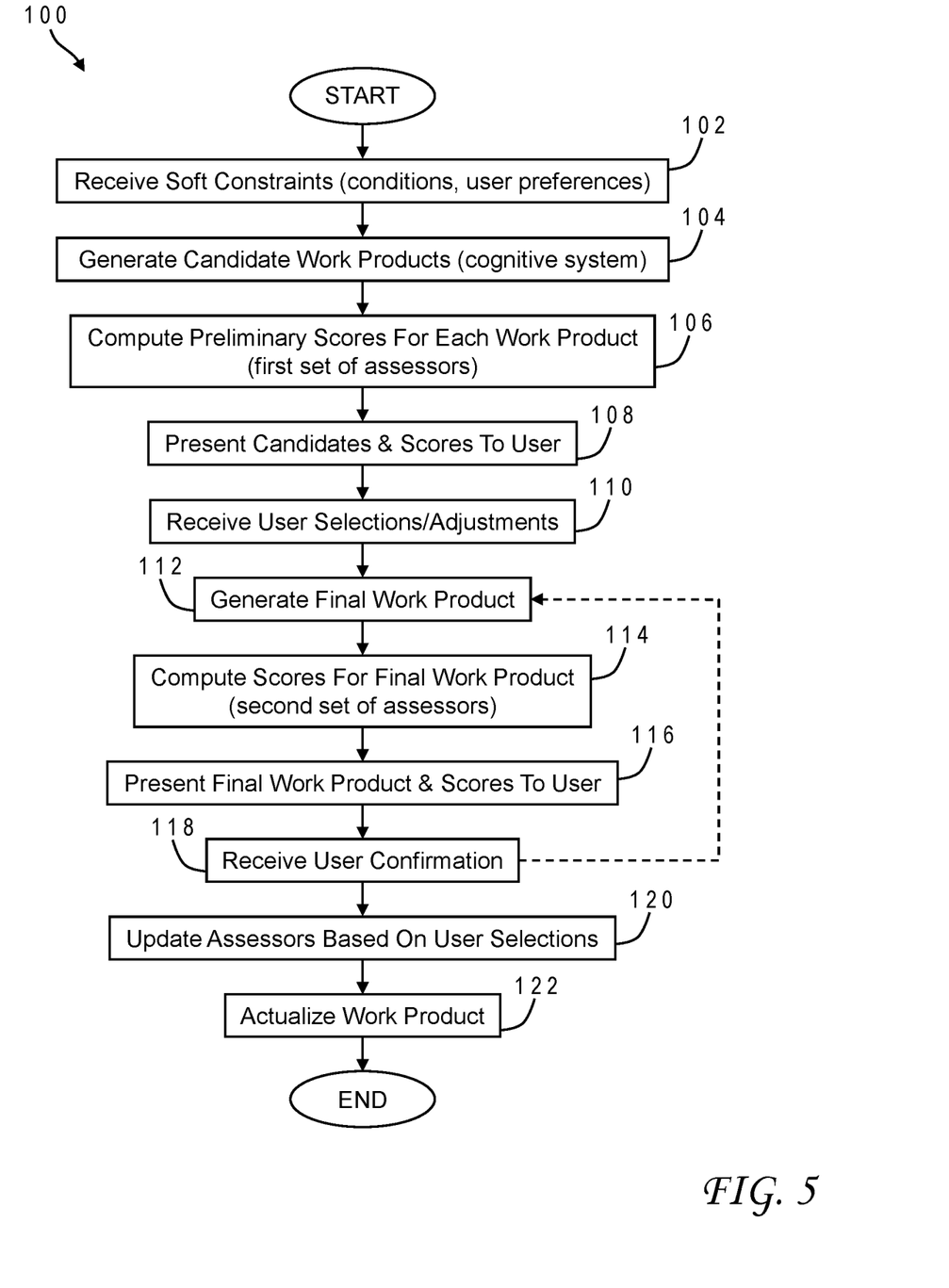
FIG. 5 is a chart showing the logical flow for a work product generation and assessment process in accordance with one implementation of the present invention.

The present invention may be further understood with reference to the chart of FIG. 5 which illustrates the logical flow for a work product generation and assessment process 100 in accordance with one implementation of the present invention which may be carried out with the assistance of computer system 10. Process 100 begins by receiving soft constraints for the desired work product (102). Candidate work products are generated by a cognitive system based on the soft constraints (104). A first set of assessors is used to compute preliminary scores for each suggested work product (106). The preliminary candidates are presented along with the scores to the user (108). The computer system then receives the user selection(s) which may include some adjustment (110). The cognitive system generates a (tentatively) final work product based on the user selection/adjustment (112). A second set of assessors is used to compute scores for the final work product (114). The final work product is presented to the user with the fine-grain scores (116). The computer system then receives the user's confirmation of this work product (118), or indicates further adjustments in which case the process returns to box 112. Once the user has confirmed the final work product, any of the assessors can be updated as appropriate (120), and the computer system can actualize the work product as appropriate according to the domain-specific details of the implementation (122).

The present invention in its various embodiments thereby achieves superior work product generation and assessment, leading to a greatly improved user experience. The assessors can provide multiple scoring with different levels of granularity, and these assessments can be orchestrated in a personalized fashion by the work product generator. This approach balances partial computer optimization with human decision, allowing for as many iterations as desired to obtain the optimum solution, all the while improving the system through machine learning.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, specific scoring techniques are suggested herein but the invention is not limited to any particular scoring system. It is therefore contemplated that such modifications can be made without departing from the spirit or scope of the present invention as defined in the appended claims.

What is claimed is:

1. A method of assessing generated work products comprising:
receiving a plurality of constraints from cognitive assessment microservices relating to the work products, by executing first instructions in a computer system,
wherein the constraints include preferences previously associated with the user that are considered desirable but not required by the cognitive system in generating the work products and constitute a coarse-grained assessment, the multiple preliminary scores constitute a medium-grained assessment concerning additional details not found in the coarse-grained assessment;
generating by the cognitive system trained according to the work product context, an output comprising a plurality of system generated candidate work products using the constraints as inputs, by executing second instructions in the computer system;
analyzing the candidate work products using a first set of multiple cognitive assessment microservices to compute multiple preliminary scores for each candidate work product, by executing third instructions in the computer system;
presenting at least a portion of the candidate work products to a user ranked according to their preliminary scores, by executing fourth instructions in the computer system;
receiving a user selection for at least one selected candidate work product from the user, by executing fifth instructions in the computer system;
generating, by the cognitive system, an output of at least one final work product using the selected candidate work product as input, wherein the final work product includes the selected candidate work product additional features, by executing sixth instructions in the computer system;
analyzing the final work product by the cognitive assessment microservices using a second set of multiple assessors which is different from the first set of multiple assessors to compute multiple final scores for the final work product, by executing seventh instructions in the computer system; and
presenting the final work product to the user with the final scores, by executing eighth instructions in the computer system;
receiving confirmation of the final work product from the user; and
taking an action based on the domain of the final work product, wherein the action includes at least one of electronically completing a purchase of a product or electronically reserving a third-party service.

2. The method of claim 1 wherein the multiple final scores constitute a fine-grained assessment concerning additional details not found in the medium-grained assessment.

3. The method of claim 1 further comprising:
receiving a user adjustment to the final work product; and
iteratively repeating (i) said generating of the final work product, (ii) said analyzing of the final work product, and (iii) said presenting of the final work product.

4. The method of claim 1 wherein the first and second assessor sets have at least one assessor in common.

5. The method of claim 4 wherein the common assessor computes a first type of score for the preliminary scores and computes a second type of score for the final scores wherein the first and second score types are based on different factors.

6. A computer system comprising:
one or more processors which process program instructions;
a memory device connected to said one or more processors; and
program instructions residing in said memory device for assessing generated work products by receiving a plurality of constraints relating to the work products from cognitive assessment microservices, wherein the constraints include preferences previously associated with the user that are considered desirable but not required by the cognitive system in generating the work products and constitute a coarse-grained assessment, the multiple preliminary scores constitute a medium-grained assessment concerning additional details not found in the coarse-grained assessment, generating by a cognitive system trained according to a work product context, an output comprising a plurality of system generated candidate work products using the constraints as inputs, analyzing the candidate work products using a first set of multiple cognitive assessment microservices to compute multiple preliminary scores for each candidate work product, presenting at least a portion of the candidate work products to a user ranked according to their preliminary scores, receiving a user selection for at least one selected candidate work product from the user, generating, by the cognitive system, an output of at least one final work product using the selected candidate work product as input, wherein the final work product includes the selected candidate work product additional features, analyzing the final work product using a second set of multiple cognitive assessment microservices assessors which is different from the first set of multiple cognitive assessment microservices assessors to compute multiple final scores for the final work product, presenting the final work product to the user with the final scores;
receiving confirmation of the final work product from the user, and take an action based on the domain of the final work product, wherein the action includes at least one of electronically completing a purchase of a product or electronically reserving a third-party service.

7. The computer system of claim 6 wherein the multiple final scores constitute a fine-grained assessment concerning additional details not found in the medium-grained assessment.

8. The computer system of claim 6 wherein said program instructions further receiving a user adjustment to the final work product, and iteratively repeat (i) the generation of the final work product, (ii) the analysis of the final work product, and (iii) the presentation of the final work product.

9. The computer system of claim 6 wherein the first and second assessor sets have at least one assessor in common.

10. The computer system of claim 6 wherein the common assessor computes a first type of score for the preliminary scores and computes a second type of score for the final scores wherein the first and second score types are based on different factors.

11. A computer program product comprising:
a computer readable storage medium; and
program instructions residing in said memory device for assessing generated work products by receiving a plurality of constraints relating to the work products from cognitive assessment microservices, wherein the constraints include preferences previously associated with the user that are considered desirable but not required by the cognitive system in generating the work products and constitute a coarse-grained assessment, the multiple preliminary scores constitute a medium-grained assessment concerning additional details not found in the coarse-grained assessment, generating by a cognitive system trained according to a work product context, an output comprising a plurality of system generated candidate work products using the constraints as inputs, analyzing the candidate work products using a first set of multiple cognitive assessment microservices to compute multiple preliminary scores for each candidate work product, presenting at least a portion of the candidate work products to a user ranked according to their preliminary scores, receiving a user selection for at least one selected candidate work product from the user, generating, by the cognitive system, an output of at least one final work product using the selected candidate work product as input, wherein the final work product includes the selected candidate work product additional features, analyzing the final work product using a second set of multiple cognitive assessment microservices assessors which is different from the first set of multiple cognitive assessment microservices assessors to compute multiple final scores for the final work product, presenting the final work product to the user with the final scores;

receiving confirmation of the final work product from the user, and take an action based on the domain of the final work product, wherein the action includes at least one of electronically completing a purchase of a product or electronically reserving a third-party service.

12. The computer program product of claim 11 wherein the multiple final scores constitute a fine-grained assessment concerning additional details not found in the medium-grained assessment.

13. The computer program product of claim 11 wherein said program instructions further receiving a user adjustment to the final work product, and iteratively repeat (i) the generation of the final work product, (ii) the analysis of the final work product, and (iii) the presentation of the final work product.

14. The computer program product of claim 11 wherein the first and second assessor sets have at least one assessor in common.

15. The computer program product of claim 11 wherein the common assessor computes a first type of score for the preliminary scores and computes a second type of score for the final scores wherein the first and second score types are based on different factors.

* * * * *